United States Patent
Yang et al.

(10) Patent No.: US 10,564,985 B2
(45) Date of Patent: Feb. 18, 2020

(54) BOOT SYSTEM AND BOOT METHOD FOR INTELLIGENT ROBOT

(71) Applicant: AROBOT INNOVATION CO., LTD., New Taipei (TW)

(72) Inventors: Shih-Ming Yang, Hsinchu County (TW); Po-Chun Yen, Taipei (TW); Shing Lee, Hsinchu (TW)

(73) Assignee: ADATA TECHNOLOGY CO., LTD., New Taipei (TW)

(*) Notice: Subject to any disclaimer, the term of this patent is extended or adjusted under 35 U.S.C. 154(b) by 281 days.

(21) Appl. No.: 15/869,337

(22) Filed: Jan. 12, 2018

(65) Prior Publication Data

US 2019/0138320 A1 May 9, 2019

(30) Foreign Application Priority Data

Nov. 3, 2017 (TW) .............................. 106138113 A

(51) Int. Cl.
| | | |
|---|---|---|
| *G06F 9/4401* | (2018.01) | |
| *H04W 12/04* | (2009.01) | |
| *B25J 13/00* | (2006.01) | |
| *H04W 76/10* | (2018.01) | |
| *G08B 25/08* | (2006.01) | |
| *G08B 3/10* | (2006.01) | |

(52) U.S. Cl.
CPC .......... *G06F 9/4416* (2013.01); *B25J 13/006* (2013.01); *G08B 25/08* (2013.01); *H04W 12/04* (2013.01); *H04W 76/10* (2018.02); *G08B 3/10* (2013.01)

(58) Field of Classification Search
CPC ...... G06F 9/4416; H04W 12/04; H04W 76/10
See application file for complete search history.

(56) References Cited

U.S. PATENT DOCUMENTS

| | | | | |
|---|---|---|---|---|
| 9,769,686 | B2 * | 9/2017 | Kang | ...................... H04L 69/18 |
| 2016/0007084 | A1 * | 1/2016 | Kim | .................... H04L 65/4084 |
| | | | | 725/30 |
| 2016/0174277 | A1 * | 6/2016 | Yoon | ..................... H04W 76/14 |
| | | | | 370/338 |
| 2017/0215261 | A1 * | 7/2017 | Potucek | ............. A61H 33/0087 |
| 2017/0359326 | A1 * | 12/2017 | Garcia | .................... H04L 63/08 |
| 2017/0359344 | A1 * | 12/2017 | Kaal | .................... H04L 61/1511 |

* cited by examiner

*Primary Examiner* — Lynn D Feild
*Assistant Examiner* — Viral S Lakhia
(74) *Attorney, Agent, or Firm* — Li & Cai Intellectual Property (USA) Office

(57) ABSTRACT

Disclosed is a boot system and boot method for an intelligent robot. The intelligent robot includes a central processing unit, an activating module, a memory and a wireless communication module. The central processing unit is electrically connected to the activating module, the memory and the wireless communication module. When the username and password stored in the memory is not compliant with the username and password of a wireless network, the intelligent robot enters a hotspot mode as a hotspot. A mobile device connects to the intelligent robot through the hotspot. The wireless communication module receives a login username and a login password from the mobile device. The intelligent robot connects to the wireless network for establishing the wireless network connection by the login username and the login password for entering a login mode.

8 Claims, 3 Drawing Sheets

BOOT SYSTEM AND BOOT METHOD FOR INTELLIGENT ROBOT

BACKGROUND OF THE INVENTION

1. Field of the Invention

The instant disclosure relates to a boot system, and in particular, to a boot system and boot method for an intelligent robot.

2. Description of Related Art

With the development of technology, robots have replaced the need for manual labor in work requiring hard labor, for example, using mechanical arms for heavy lifting or complicated processes. In recent years, domestic robots have been widely accepted by people, and may be used for image capturing, playing multimedia, cleaning and human-robot interaction. However, the boot process of robots generally involves complex procedures, which causes inconveniences in use.

SUMMARY OF THE INVENTION

The instant disclosure provides a boot system for an intelligent robot. The intelligent robot connects to a wireless network. The intelligent robot includes a central processing unit, an activating module, a memory and a wireless communication module. The activating module is electrically connected to the central processing unit, and the activating module is configured to receive an activating signal. The memory is electrically connected to the central processing unit, the memory stores a plurality of usernames and passwords, the plurality of usernames and passwords are configured to connect to the wireless network. The wireless communication module is electrically connected to the central processing unit, the wireless communicating module is configured to connect to the wireless network. When the activating module is enabled, the central processing unit determines whether the wireless communication module establishes a wireless network connection with the wireless network. When the username and password stored in the memory is not compliant with the username and password of the wireless network, the intelligent robot does not establish the wireless network connection, and the intelligent robot enters a hotspot mode as a hotspot. A mobile device then connects to the intelligent robot through the hotspot, the wireless communication module receives a login username and a login password from the mobile device, and the intelligent robot connects to the wireless network for establishing the wireless network connection by the login username and the login password for entering a login mode.

The instant disclosure further provides a boot method for an intelligent robot. The intelligent robot includes a central processing unit, an activating module, a memory and a wireless communication module. The central processing unit is electrically connected to the activating module, the memory and the wireless communication module. The boot method includes: receiving an activating signal by the activating module; storing a plurality of usernames and passwords by the memory, the plurality of usernames and the passwords being configured to connect to the wireless network; connecting the wireless network by the wireless communication module. When the activating module is enabled, the central processing unit determines whether the wireless communication module establishes a wireless network connection with the wireless network. When the username and password stored in the memory is not compliant with the username and password of the wireless network, the intelligent robot does not establish the wireless network connection, and the intelligent robot enters a hotspot mode as a hotspot. A mobile device then connects to the intelligent robot through the hotspot, the wireless communication module receives a login username and a login password from the mobile device, and the intelligent robot connects to the wireless network for establishing the wireless network connection by the login username and the login password for entering a login mode.

For further understanding of the instant disclosure, reference is made to the following detailed description illustrating the embodiments of the instant disclosure. The description is only for illustrating the instant disclosure, and should not be construed as limiting the scope of the claim.

BRIEF DESCRIPTION OF THE DRAWINGS

Embodiments are illustrated by way of example and not by way of limitation in the figures of the accompanying drawings, in which like references indicate similar elements and in which.

DETAILED DESCRIPTION OF PREFERRED EMBODIMENTS

Figure 1:
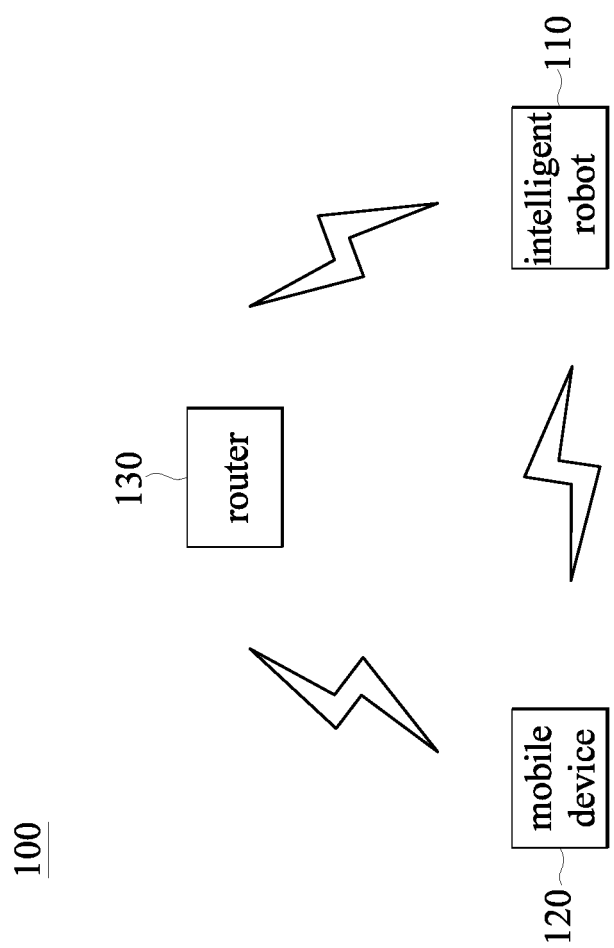
FIG. 1 shows a block diagram of a boot system for an intelligent robot of one embodiment of the instant disclosure.

Reference is made to FIG. 1. FIG. 1 shows a block diagram of a boot system for an intelligent robot of one embodiment of the instant disclosure. The boot system 100 includes an intelligent robot 110, a mobile device 120 and a router 130. A user may connect to the wireless network by wireless communication module of the mobile device 120. There may be two, three or five domestic intelligent robots, and any one of these intelligent robots may connect to the wireless network by built-in username and password. In addition, when the mobile device 120 connects to the intelligent robot 110 by the wireless network, a display screen of the mobile device 120 is configured to display the username and password for connecting to the wireless network. The intelligent robot 110 automatically connects to the router 130 after receiving the username and password from the mobile device 120. The intelligent robot 110 generates specific light or sound for informing the user of a successful connection. On the the other hand, the intelligent robot 110 generates another specific light or sound for informing the user of a failed connection, and the user may initialize the intelligent robot 110 for connecting to the mobile device 120 again.

Figure 2:
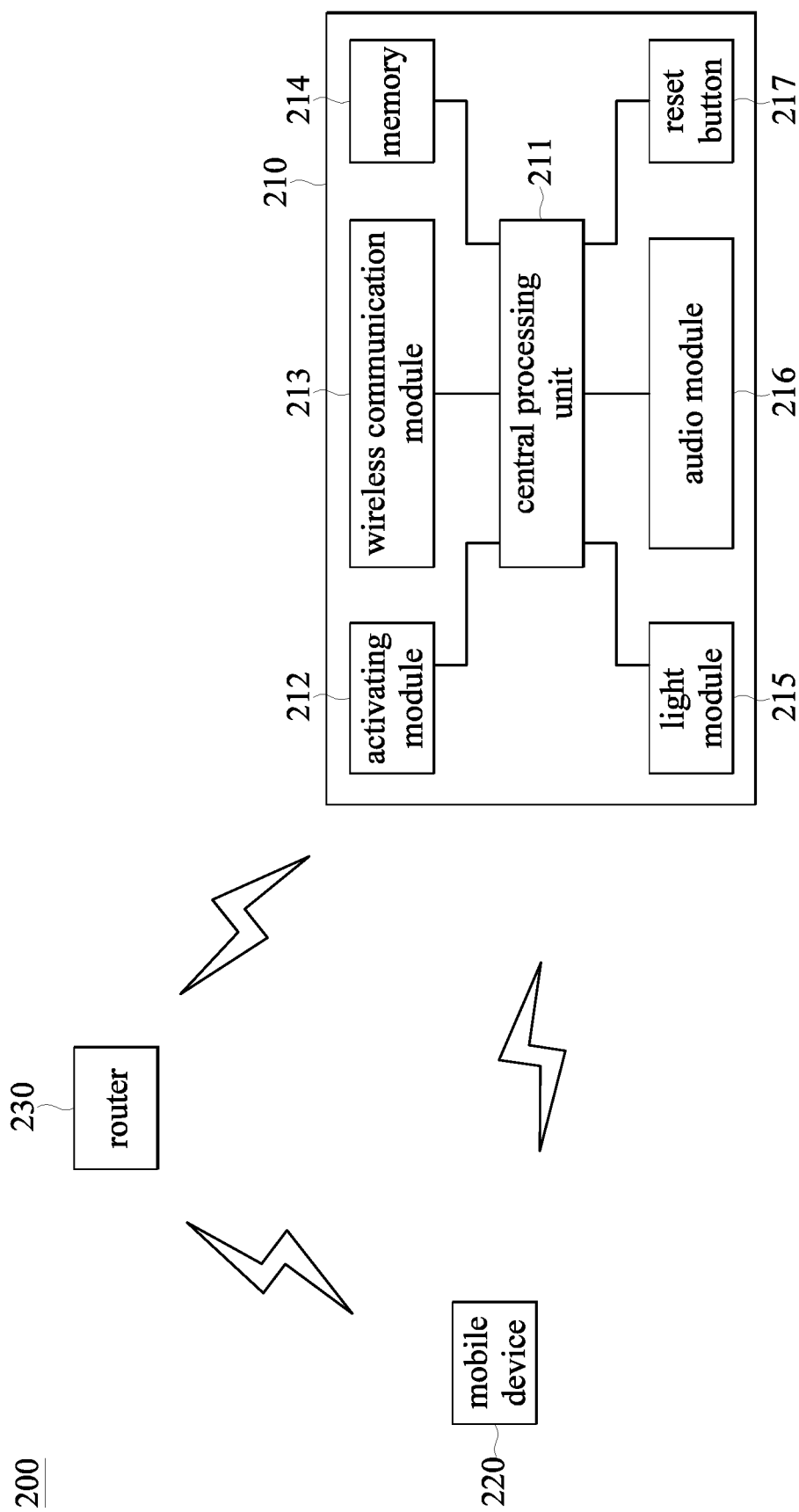
FIG. 2 shows a block diagram of a boot system for an intelligent robot of another embodiment of the instant disclosure.

Reference is next made to FIG. 2. FIG. 2 shows a block diagram of a boot system for an intelligent robot of another embodiment of the instant disclosure. The boot system 200 includes an intelligent robot 210, a mobile device 220 and a router 230.

The intelligent robot 210 is configured to connect to the wireless network. The intelligent robot 210 includes a central processing unit 211, an activating module 212, a wireless communication module 213, a memory 214, a light module 215, an audio module 216 and a reset button 217. The central processing unit 211 is electrically connected to the activating module 212, the wireless communication module 213 and the memory 214. The activating module 212 is configured to receive an activating signal, for example, the activating module 212 may be a button or a knob. When the user turn on the button or knob, a battery (not shown) of the intelligent robot 210 provides electric energy to other electric components thereof. The memory 214 is configured to store a plurality of usernames and passwords. The plurality of usernames and passwords are configured to connect to the wireless network. In other words, when the activating module 212 receives the activating signal, the intelligent robot 210 connects to the wireless network by the built-in username and password stored in the memory 214. The wireless communication module 213 may receive or transmit wireless signals by the wireless network. In addition, the intelligent robot 210 may include a sensor (not shown) configured to detect an object. For example, the mobile devise 220 may automatically open a camera lens when a distance between a human and the intelligent robot 210 is less than two meters, for capturing the image of the human and distinguishing gender, age, and so forth.

More specifically, the activating module 212 is enabled after receiving the activating signal. The central processing unit 211 determines whether the wireless communication module 213 establishes a wireless network connection with the wireless network. The central processing unit 211 determines the data transfer rate of the wireless network by the wireless communication module 213. When the username and password stored in the memory 214 is not compliant with the username and password of the wireless network, the wireless communication module 213 does not establish the wireless network connection, the intelligent robot 210 enters a hotspot mode as a hotspot, and the mobile device 220 connects to the intelligent robot 210 through the hotspot. The wireless communication module 213 receives a login username (e.g., 12345) and a login password (e.g., abcde) from the mobile device 220. Then, the intelligent robot 210 connects to the wireless network through the router 230 for establishing the wireless network connection by the login username and the login password for entering a login mode.

The wireless communication module 213 determines whether the intelligent robot 210 connects to the wireless network through the router 230, the intelligent robot 210 receives a plurality of assigning commands from the router 230 and generates an assigning behavior according to the plurality of assigning commands. For example, the user may control the direction and speed of the intelligent robot 210 (e.g., turn left, turn right, accelerate or decelerate) by the mobile device 220. The user may also control the intelligent robot 210 for broadcasting or cleaning by the mobile device 220.

The light module 215 is electrically connected to the central processing unit 211. When the mobile device 220 connects to the intelligent robot 210 through the hotspot, the intelligent robot 210 outputs a hotspot signal for emitting a first light by the light module 215; the first light may be a blue light. When the mobile device disconnects from the intelligent robot 210 through the hotspot, the intelligent robot 210 outputs a non-hotspot signal for emitting a second light by the light module; the second light may be an orange light.

The audio module 216 is connected to the central processing unit 211. When the mobile device 220 connects to the intelligent robot 210 through the hotspot, the intelligent robot 210 outputs the hotspot signal for outputting a first sound through the audio module, for example, the first sound may be a long sound lasting for three-seconds. When the mobile device 220 disconnects from the intelligent robot 210 through the hotspot, the intelligent robot 210 outputs a non-hotspot signal for outputting a second sound by the audio module, for example, the second sound may be a short sound lasting for only two-seconds.

The reset button 217 is electrically connected to central processing unit 211. When the intelligent robot 210 disconnects from a router 230, the intelligent robot 210 generates a reset signal, for example, the reset signal may emit a red light by the light module 215 or output a short sound through the audio module 216 for reminding the user to turn on the reset button 217. The reset button 217 is configured to receive an initialization signal for initializing the intelligent robot 210. The central processing unit 211 reexamines whether the wireless communication module 213 of the intelligent robot 210 is connected to the wireless network.

Figure 3:
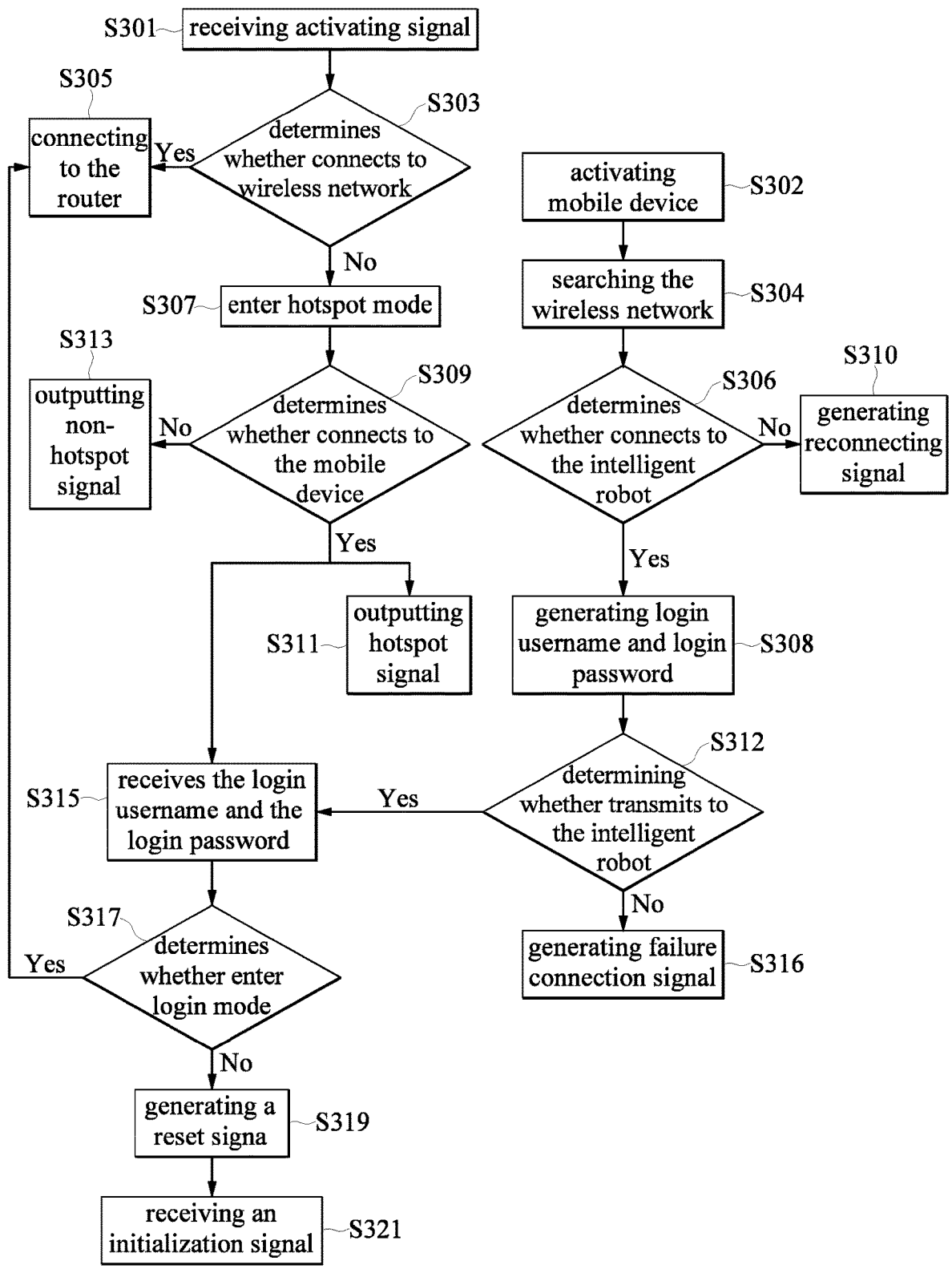
FIG. 3 shows a flow chart of a boot method for an intelligent robot of one embodiment of the instant disclosure.

In conjunction with FIG. 2, FIG. 3 shows a flow chart of a boot method for an intelligent robot of one embodiment of the instant disclosure. The boot method of the intelligent robot 210 is configured to connect to a wireless network. The intelligent robot 210 includes an activating module 212, a central processing unit 211, a wireless communication module 213 and a memory 214. The central processing unit 211 is electrically connected to the activating module 212, the wireless communication 213 and the memory 214.

In Step S301 of the boot method, an activating signal is received by an activating module 212. In Step S303, the wireless communication module 213 determines whether the intelligent robot 210 is connected to the wireless network. If yes, the method proceeds to Step S305; if not, the method proceeds to Step S307. The memory 214 is configured to store a plurality of usernames and passwords. When the activating module 212 receives the activating signal, the memory 214 of the intelligent robot 210 automatically connects to the wireless network by built-in usernames and passwords. In Step S305, the wireless communication module 213 connects to the router 230. In Step S307, the intelligent robot 210 enters the hotspot mode.

In Step S302, a mobile device 220 is activated. In Step S304, the wireless network is searched by the wireless communication module 213 of the mobile device 220, for example, the wireless network may be a WIFI network. In Step S306, whether the mobile device 220 is connected to the intelligent robot 210 is determined. If yes, the method proceeds to Step S308; but if not, the method proceeds to Step S310. In Step S308, a login username and a login password is generated by a display screen of the mobile device 220. In Step S310, a reconnecting signal is generated by the display screen of the mobile device 220. In Step S312, whether the mobile device 210 transmits the username and the password to the intelligent robot 210 is determined. If yes, the method proceeds to Step 315; if not, the method proceeds to Step S316. In Step S316, a connection failure signal is generated by the display screen of the mobile device 220.

In Step S309, the central processing unit 211 determines whether the intelligent robot 210 is connected to the mobile device 220. If yes, the method proceeds to Step S311 and S315; if not, the method proceeds to Step S313. In Step S311, a hotspot signal is output by the intelligent robot 210, the hotspot signal may emit a first light through the light module 215 and a first sound through the audio module 216. In Step S313, a non-hotspot signal is output by the intelligent robot 210, the non-hotspot signal may emit a second light through the light module 215 and a second sound by the audio module 216.

In Step S315, the wireless communication module 213 receives the login username and the login password from the mobile device 220. In Step S317, the central processing unit 211 determines whether the intelligent robot 210 enters the login mode. If yes, the method goes to Step S305; if not, the method goes to Step S319. In Step S319, a reset signal is generated by the intelligent robot 210, for example, the reset signal may output short sound through the audio module 218. In Step S321, an initialization signal is received by the reset button 217 for initializing the intelligent robot 210.

To sum up, the instant disclosure provides a boot system and a boot method for an intelligent robot. The intelligent robot includes a memory and a wireless communication module. The memory stores a plurality of usernames and passwords for connecting to a wireless network. When the username and password of the memory disconnects from the wireless network, the intelligent robot enters a hotspot mode as a hotspot. The wireless communication automatically connects to the wireless network by a login username and login password from the mobile device. In addition, when the intelligent robot disconnects from the router, it can attempt to reconnect to the wireless network when a reset button is pressed, which increases the convenience of the boot system.

The descriptions illustrated supra set forth simply the preferred embodiments of the instant disclosure; however, the characteristics of the instant disclosure are by no means restricted thereto. All changes, alterations, or modifications conveniently considered by those skilled in the art are deemed to be encompassed within the scope of the instant disclosure delineated by the following claims.

What is claimed is:

1. A boot system for an intelligent robot, the boot system connects to a wireless network, the boot system comprising:
a central processing unit;
an activating module electrically connected to the central processing unit, the activating module configured to receive an activating signal;
a memory electrically connected to the central processing unit, the memory storing a plurality of usernames and passwords, the plurality of usernames and passwords being configured to connect to the wireless network;
a wireless communication module electrically connected to the central processing unit, the wireless communicating module being configured to connect to the wireless network;
wherein when the activating module is enabled, the central processing unit determines whether the wireless communication module establishes a wireless network connection with the wireless network, when the username and password stored in the memory is not compliant with the username and password of the wireless network, the intelligent robot does not establish the wireless network connection, and wherein the intelligent robot enters a hotspot mode as a hotspot, a mobile device connects to the intelligent robot through the hotspot, the wireless communication module receives a login username and a login password form the mobile device, and the intelligent robot connects to the wireless network for establishing the wireless network connection by the login username and the login password for entering a login mode;
wherein the intelligent robot includes a light module electrically connected to the central processing unit, when the mobile device connects to the intelligent robot through the hotspot, the intelligent robot outputs a hotspot signal for emitting a first light through the light module, when the mobile device disconnects from the intelligent robot through the hotspot, the intelligent robot outputs a non-hotspot signal for emitting a second light through the light module.

2. The boot system according to claim 1, wherein when the wireless communication module determines that the intelligent robot is connected to the wireless network through a router, the intelligent robot receives a plurality of assigning commands from the router and generates an assigning behavior according to the plurality of assigning commands.

3. The boot system according to claim 1, wherein the intelligent robot includes an audio module connected to the central processing unit, when the mobile device connects to the intelligent robot through the hotspot, the intelligent robot outputs a hotspot signal for outputting a first sound through the audio module, when the mobile device disconnects from the intelligent robot through the hotspot, the intelligent robot outputs a non-hotspot signal for outputting a second sound through the audio module.

4. The boot system according to claim 1, wherein the intelligent robot includes a reset button electrically connected to the central processing unit, when the intelligent robot disconnects from a router, the intelligent robot generates a reset signal, the reset button being configured to receive an initialization signal for initializing the intelligent robot.

5. A boot method for an intelligent robot, the intelligent robot connecting to a wireless network, the intelligent robot having a central processing unit, an activating module, a memory and a wireless communication module, the central processing unit being electrically connected to the activating module, the memory and the wireless communication module, the boot method comprising:
receiving an activating signal by the activating module;
storing a plurality of usernames and passwords by the memory, the plurality of usernames and the passwords configured to connect to the wireless network; and
connecting to the wireless network by the wireless communication module;
wherein when the activating module is enabled, the central processing unit determines whether the wireless communication module establishes a wireless network connection with the wireless network, when the username and password stored in the memory is not compliant with the username and password of the wireless network, the intelligent robot does not establish the wireless network connection, and wherein the intelligent robot enters a hotspot mode as a hotspot, a mobile device connects to the intelligent robot through the hotspot, the wireless communication module receives a login username and a login password form the mobile device, and the intelligent robot connects to the wireless network for establishing the wireless network connection by the login username and the login password for entering a login mode;
wherein the intelligent robot further including a light module electrically connected to the central processing unit, the boot method further comprising:
when the mobile device connects to the intelligent robot through the hotspot, the intelligent robot outputs a hotspot signal for emitting a first light through the light module, and when the mobile device disconnects from the intelligent robot through the hotspot, the intelligent robot outputs a non-hotspot signal for emitting a second light through the light module.

6. The boot method according to claim 5, wherein when the wireless communication module determines that the intelligent robot is connected to the wireless network through a router, the intelligent robot receives a plurality of assigning commands and generates an assigning behavior according to the plurality of assigning commands.

7. The boot method according to claim 5, the intelligent robot further including an audio module connected to the central processing unit, the boot method further comprising:
when the mobile device connects to the intelligent robot through the hotspot, the intelligent robot outputs a hotspot signal for outputting a first sound through the audio module, and when the mobile device disconnects from the intelligent robot through the hotspot, the intelligent robot outputs a non-hotspot signal for outputting a second sound through the audio module.

8. The boot method according to claim 5, the intelligent robot further including a reset button electrically connected to central processing unit, the boot method further comprising:
when the intelligent robot disconnects from a router, the intelligent robot generates a reset signal, the reset button being configured to receive an initialization signal for initializing the intelligent robot.

* * * * *